INVENTOR
HIDEYASU MAJIMA
BY
H. Edward Nestern

FIG. 3A
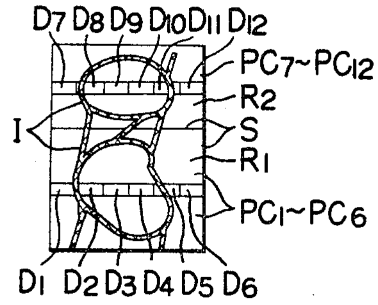
FIG. 3C
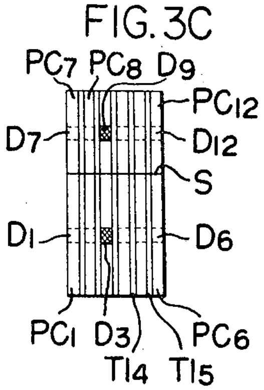
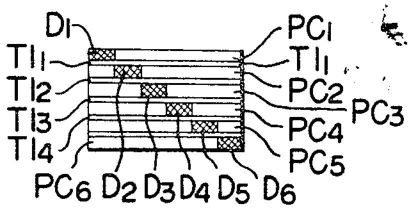
FIG. 3B
FIG. 4A FIG. 4B FIG. 4C FIG. 4D
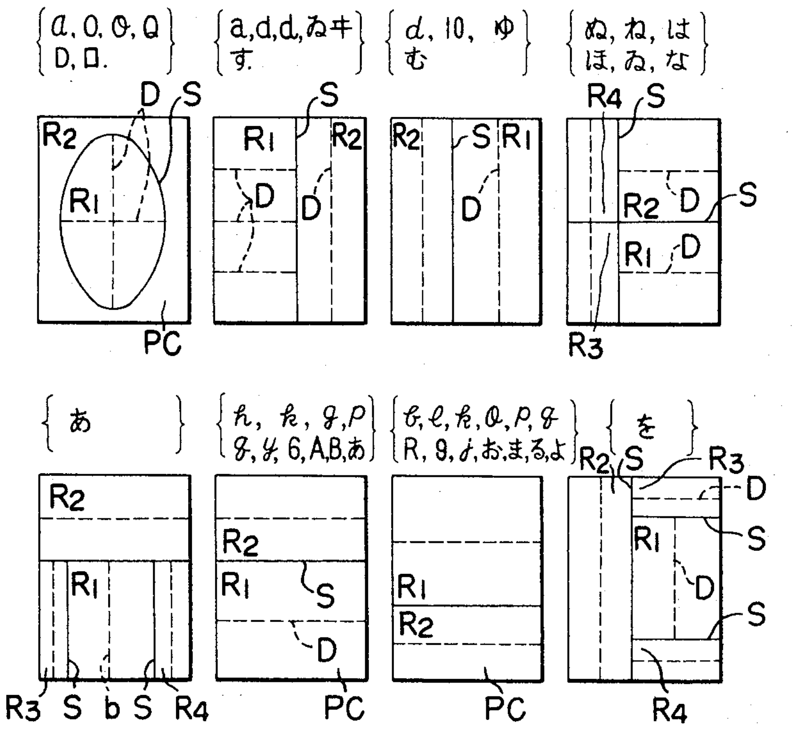
FIG. 4E FIG. 4F FIG. 4G FIG. 4H
INVENTOR
HIDEYASU MAJIMA
BY
H. Edward Moston INVENTOR
HIDEYASU MAJIMA
BY
H. Edward Nestern INVENTOR
HIDEYASU MAJIMA
BY
H. Edward [signature]

FIG. 13
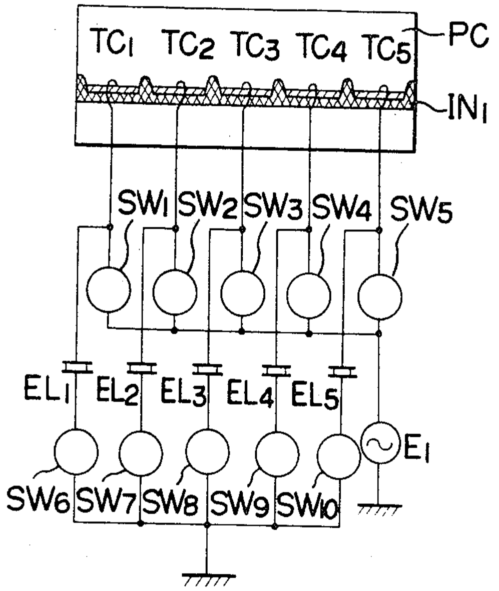
FIG. 14
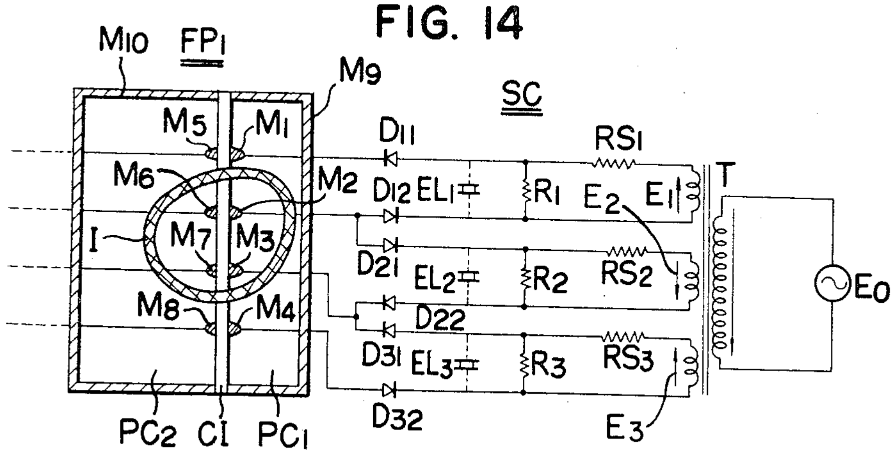
FIG. 15A
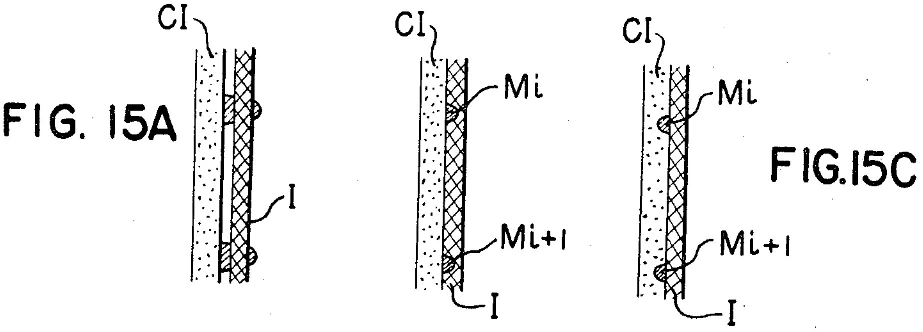
FIG. 15C
FIG. 15B
INVENTOR
HIDEYASU MAJIMA
BY
H. Edward ...

FIG. 16
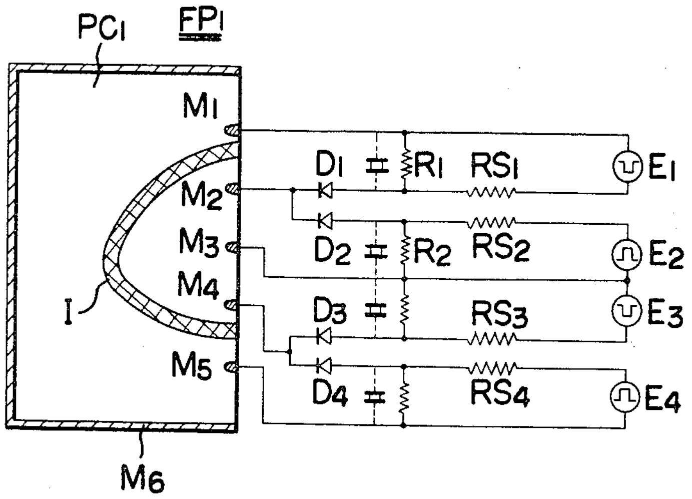
FIG. 17A
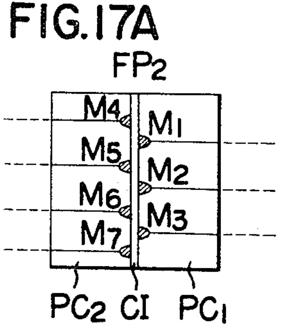
FIG. 17B
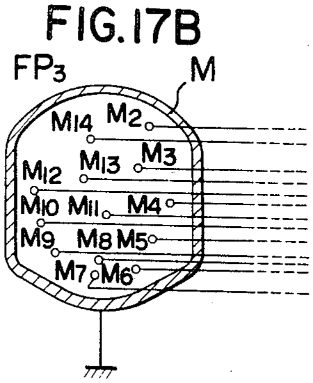
FIG. 18
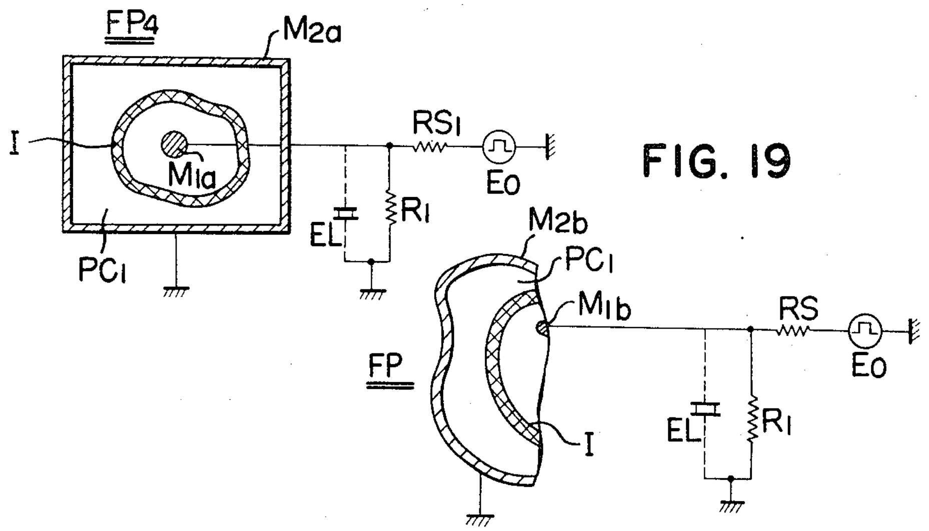
FIG. 18, FIG. 19
INVENTOR
HIDEYASU MAJIMA
BY
H. Edw...

INVENTOR
HIDEYASU MAJIMA
BY
H. Edward ...

FIG. 23
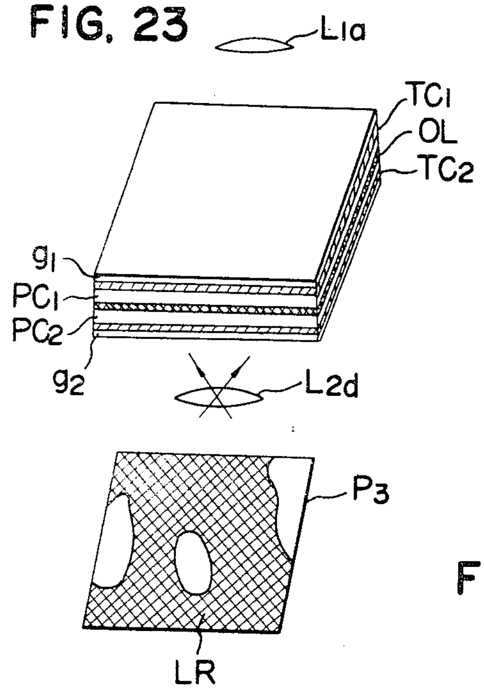
FIG. 24A
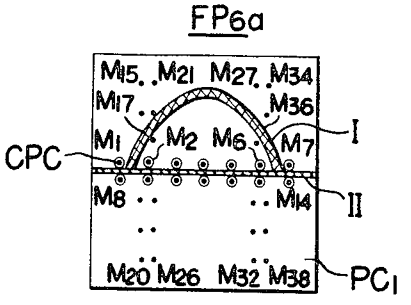
FIG. 24B
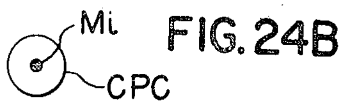
FIG. 25A
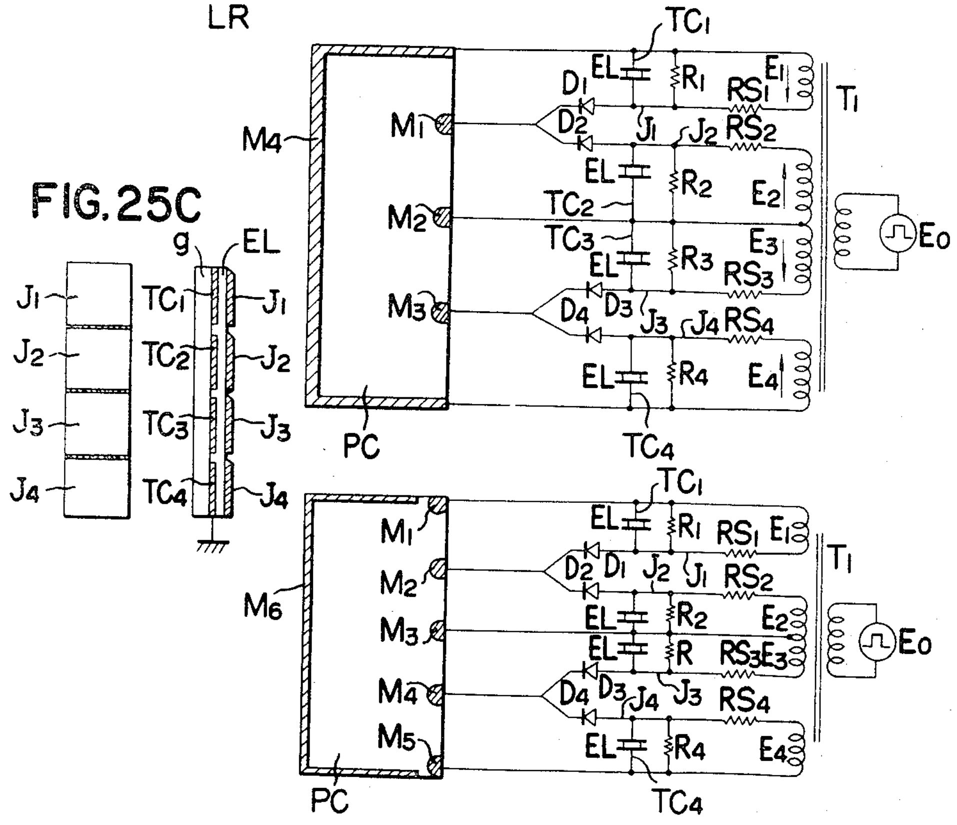
FIG. 25C
FIG. 25B
INVENTOR
HIDEYASU MAJIMA
BY
H. Edward ...

INVENTOR
HIDEYASU MAJIMA
BY
H. Edward M...

INVENTOR
HIDEYASU MAJIMA
BY

United States Patent Office

3,525,981

Patented Aug. 25, 1970

3,525,981
METHOD AND SYSTEM FOR DETECTION OF PATTERN FEATURES

Hideyasu Majima, Hachioji-shi, Tokyo-to, Japan, assignor to Kabushiki Kaisha Hitachi Seisakusho, Tokyo-to, Japan, a joint-stock company of Japan Filed July 29, 1965, Ser No. 475,662
Claims priority, application Japan, July 31, 1964, 39/42,939; Apr. 26, 1965, 40/24,310
Int. Cl. G06k 9/12
U.S. Cl. 340—146.3 7 Claims

ABSTRACT OF THE DISCLOSURE

A pattern feature detection system has an electrically continuous region, means to form patterns on that region, electrical connecting means provided in that region, a load connected to at least one of the electrical connecting means, and means to produce at least one output when a pattern image is formed on said region in a form to interconnect a space interval defined by at least two points on that region.

This invention relates to detection of pattern features. More particularly, the invention relates to a method and means for detecting pattern features, particularly rings (or loops), convexities, and concavities of patterns, principally in a pattern recognizing system.

In many known pattern recognizing systems, especially in character readers, features such as rings and upper, lower, left, and right concavities and convexities of patterns are detected as topological and universal features of characters thereby to obtain effective clues for discrimination of characters. The detection of features such as these rings, concavities, and convexities has heretofore required complicated logical operation and has not been reduced to practice because apparatus for satisfactory detection of these features, including positional information, has been excessively expensive.

In many of these known character reading systems, even those depending on so-called sophisticated hardware techniques, the operation in each case has entailed receiving an optical pattern by means such as a cathode ray tube (for example, a videcon or a flying spot scanner), solar batteries, and phototransistors, converting this pattern into pulse signals, and carrying out calculative operation by means of logical devices corresponding to electronic computer hardware. In these conventional apparatuses involving devices for photoelectric conversion and various processing, however, there has unavoidably been much introduction of unnecessary waste due to quantization, serialization, and other conditions.

In contrast, the present invention contemplates the provision of a very convenient and inexpensive feature detecting method and means by which optical patterns as input are photoelectrically converted, and features are simultaneously detected, these features, moreover, being accompanied by positional information. More specifically, the invention provides a new feature detecting method and means wherein, by conversion to the equivalent digital operation of a two-dimensional pattern directly and simultaneously, extremely complicated operations can be carried out, and the results thereof are simultaneously indicated.

In pattern recognition, in general, reading systems which have little relationship to characteristics such as the line thicknesses, positions, sizes, directions, forms, and blurring of characters are important. In contrast, the present invention affords extremely great tolerance for such characteristics and, moreover, makes possible natural calculative operations which, on the point of no quantization whatsoever being carried out, were inconceivable in the prior art.

It is a prime object of the present invention to detect features of patterns, particularly to detect rings, concavities, and convexities on a planar region. This object may be divided into the following two objects.

The first object is to provide a method and means wherein, by causing a pattern to form an image on a photosensitive structure provided with a plurality of electrodes, the space interval between any two or more electrodes is caused to become conductive, and an electrical or optical output is obtained, whereby the photoelectric conversion of the pattern and detection of its features can be accomplished almost simultaneously and, at the same time, in a simple manner. In other words, this method and means is applicable principally to the case of negative patterns inscribed in white on a black background.

The second object is to provide a method and means for producing an effect which is the reverse of that of the above first object, that is, for detecting pattern features by causing the interval between two or more electrodes to become nonconductive. The applications of this method and means are principally those for the case of positive patterns inscribed in black on a white background.

Another object of the present invention is to provide a method of partitioning variable regions for freely partitioning recognition regions according to light images and a method of forming variable conductive regions for varying conductive regions according to patterns and to utilize these two methods in feature detection.

According to the present invention, briefly stated, there is provided a system for detection of pattern features comprising an electrically continuous region, means to form patterns on said region, electrically connecting means provided in said region, a load connected to at least one of said electrically connecting means, and means to produce at least one output when a pattern image is formed on said region in a form to interconnect a space interval defined by at least two points on said region thereby to detect rings or loops, concavities, and convexities of the pattern as features thereof.

The nature, principle, and details of the invention will be more clearly apparent from the following description taken in conjunction with the accompanying drawings in which like parts are designated by like reference characters, and in which:

FIGS. 3A–3C show schematic views indicating one embodiment of the invention of the example construction illustrated in FIGS. 2A–2D;

Figure 5A:
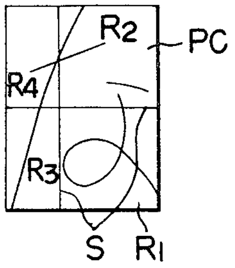
Figure 5B:
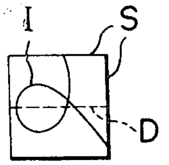
Figure 6A:
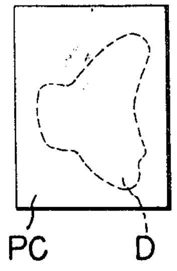
Figure 6B:
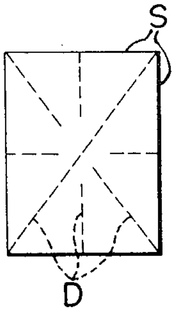
Figure 6C:
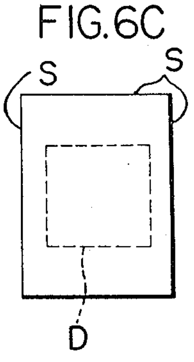
Figures 7A, 7B, 7C, 8A, 8B:
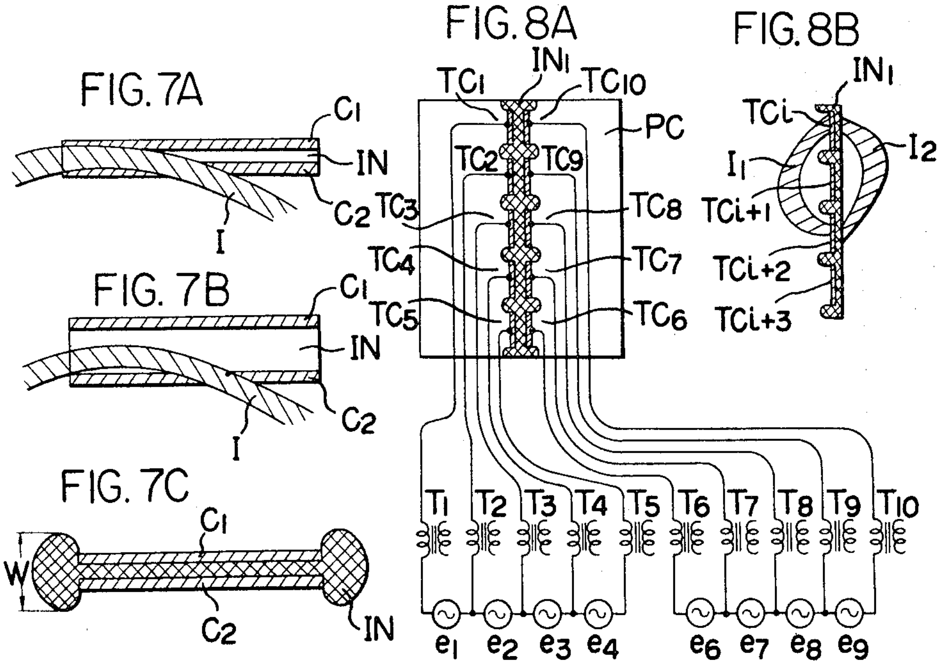
Figures 9A, 9B:
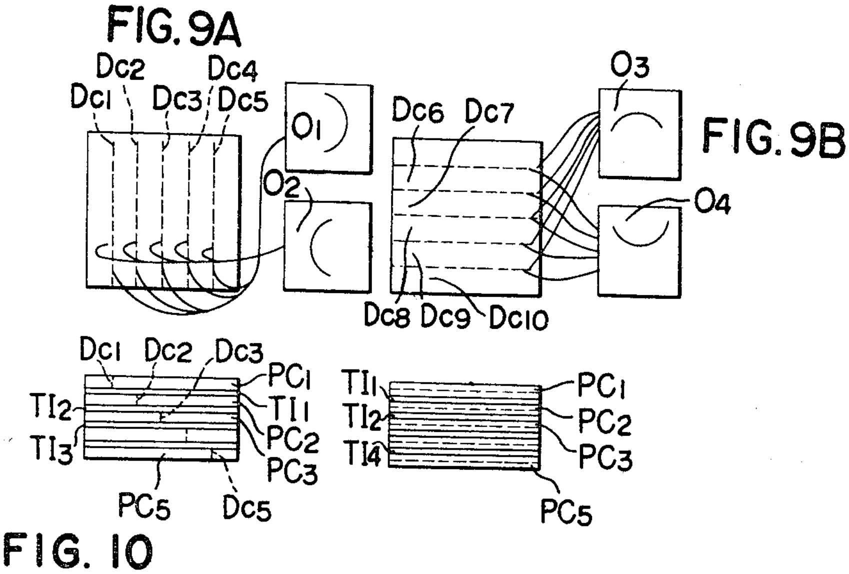
Figure 10:
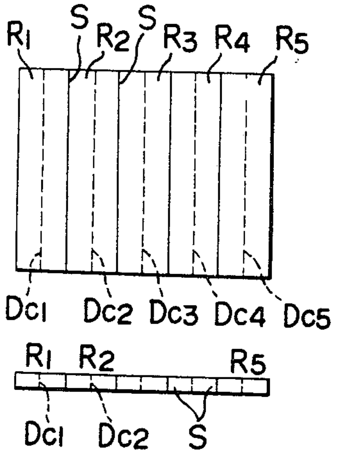
Figure 11:
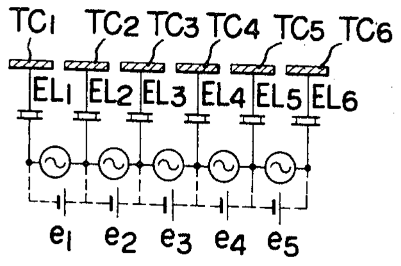
Figure 12:
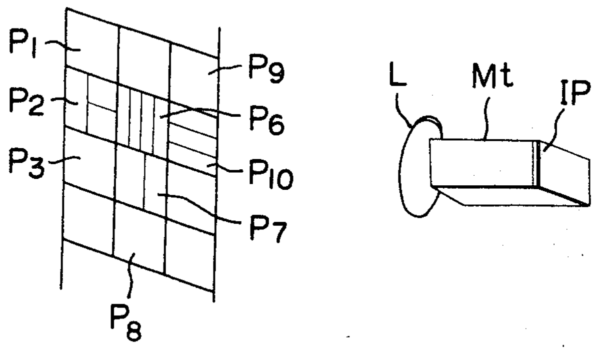
Figure 20A:
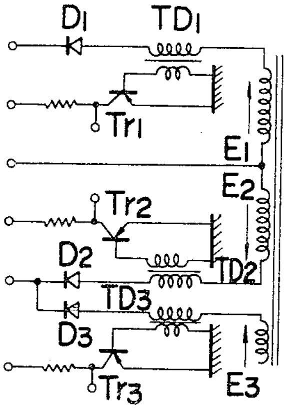
Figure 20B:
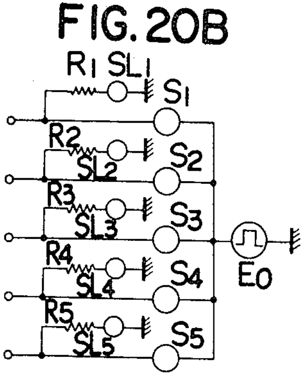
Figure 20C:
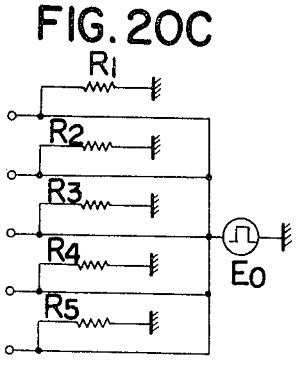
Figures 21A, 21B, 21C, 22:
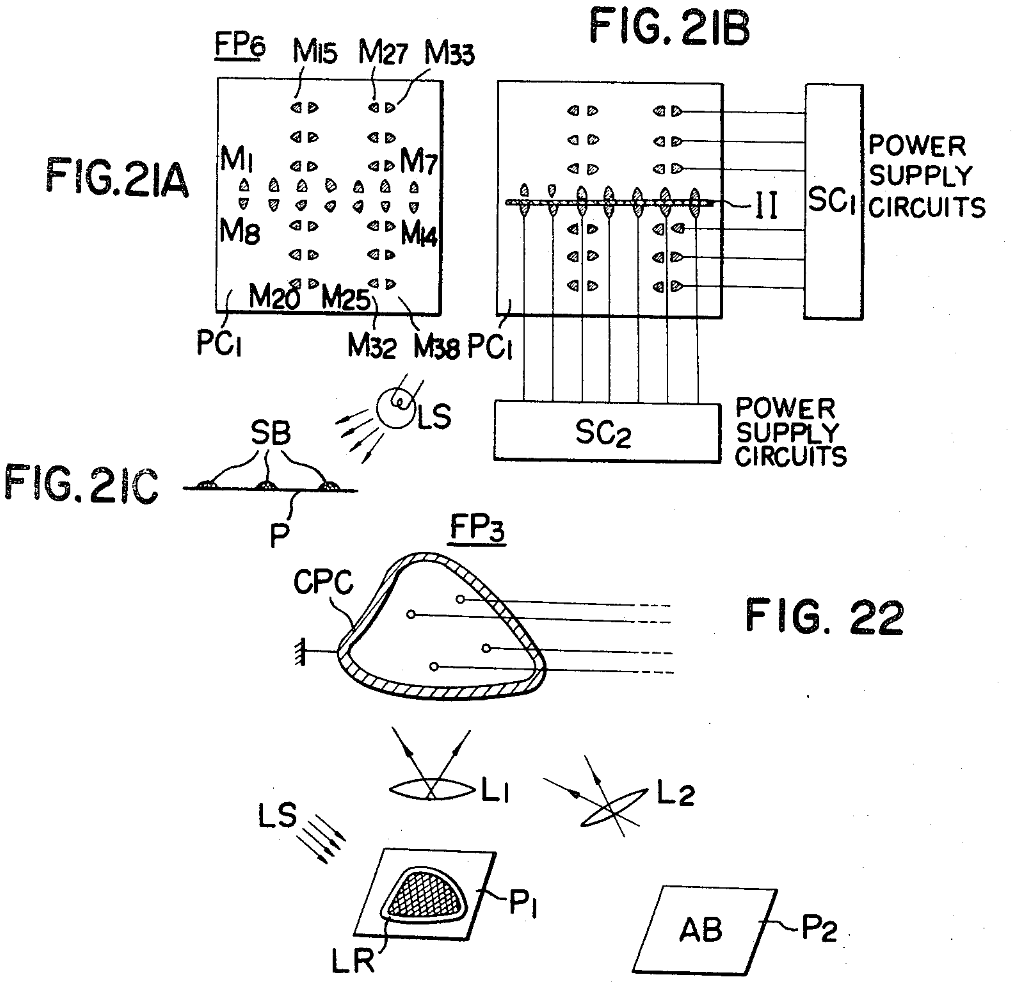

FIGS. 4A–4H schematically show an example of partitioning in the case of application of the method of the invention to detection of features of character patterns;

FIGS. 5A and 5B consist of diagrams indicating the operation corresponding to the method indicated in FIGS. 4A–4H;

FIGS. 6A–6C consist of diagrams indicating an arrangement of an essential detection element (element for detection of ring-shaped patterns) of the present invention;

FIGS. 7A–7C consist of constructional diagrams for a description of the relationship between the thickness of lines of a pattern (character) and spacing of electrodes of the detection element;

FIGS. 8A and 8B consist of schematic diagrams showing another example of basic construction according to the invention;

FIGS. 9A, 9B and 10 are schematic views showing examples of an embodiment of the invention of the construction shown in FIGS. 8A and 8B;

FIG. 11 is a schematic diagram indicating an example of the method of taking out loads according to the invention;

FIG. 12 consists of views indicating another embodiment of the invention;

FIG. 13 is a schematic diagram showing one example of accomplishing the connections of the power source switches and loads by the serial switching method according to the invention;

FIGS. 14 and 16 are schematic diagrams showing the composition and arrangement of one example of simultaneous detection of features according to the invention;

FIGS. 15A–15C consist of fragmentary views of electrodes for a description of desirable values of dimensions of electrodes to be used in the examples shown in FIGS. 14 and 16;

FIGS. 17A, 17B, 18, and 19 are diagrams showing other examples of the feature detection panel constituting an essential component of the invention;

FIGS. 20A–20C consist of circuit diagrams showing three examples of operational switch circuits according to the invention;

FIGS. 21A–21C consist of diagrams indicating the principle of variable insulation representing one method of establishing regional partitions by means of an image pattern;

FIGS. 22 and 23 are schematic views for a description of the principles of two examples of a variable electrode method;

FIGS. 24A and 24B are diagrams indicating an improvement of the relationship between the electrodes and the image shown in FIGS. 21A–21C;

FIGS. 25A–25C consist of schematic diagrams showing the composition and arrangement of an example of a method of detecting left-hand convexities of patterns and load arrangement therefor; and FIGS. 26A–26E and 27A–27D are diagrams for a description of examples of mosaic composition for reading handwritten characters.

The photoelectrical materials which most directly exhibit the functional capacity of the present invention in the processing of optical patterns are photoconductors. Feature detection will be described hereinbelow principally with respect to method and means utilizing photoconductors.

Figure 1A:
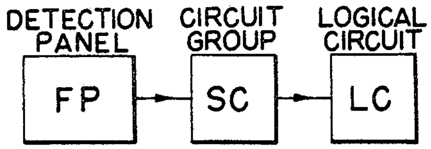
FIGS. 1A and 1B show general block diagrams of systems for accomplishing the operation of the feature detecting element according to the invention.
Figure 1B:
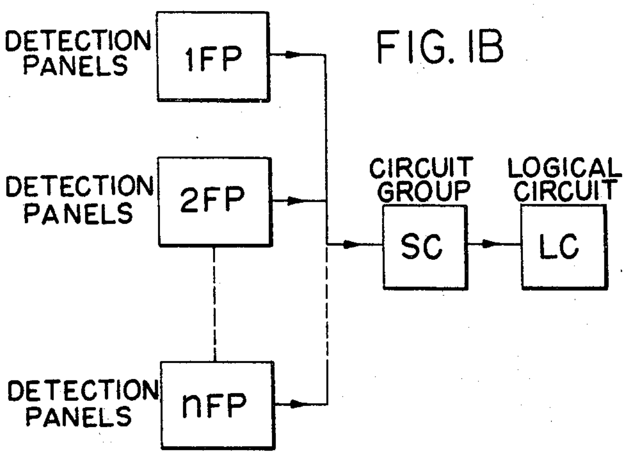

Referring to FIGS. 1A and 1B, the block diagrams shown therein indicate examples of the essential composition and arrangement of the pattern feature detection system of the present invention. Reference symbol FP designates a pattern feature detection panel which constitutes the central component of the system according to the invention, and which is capable of detecting principally pattern features such as rings, concavities, and convexities. To electrodes within the detection panel FP, there is connected a circuit group SC for detecting patterns, which circuit group is connected to and controlled by a logical circuit LC.

The logical circuit LC discriminates the output due to detection within the circuits (circuit networks) SC and functions as to logical circuit section for sending resulting signals to the succeeding stage. In some cases when the output of the circuits SC is light such as electroluminescence (hereinafter referred to simply as EL), this logical circuit LC is an optronic logical circuit.

The block diagram shown in FIG. 1B indicates a system arrangement wherein *n* feature detection panels 1 FP. 2 FP . . . *n* FP are respectively used, and strong features therefrom are detected and processed.

Since the principal components of the system of this invention are the feature detection panel FP and the circuits SC, detailed description of the logical circuit LC will herein be omitted.

Figure 2A:
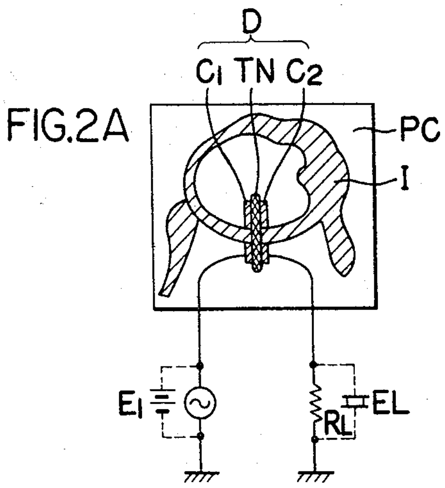
FIGS. 2A–2D show schematic views, in plan and section, indicating examples of basic construction of elements for the system of the invention.
Figure 2B:
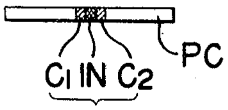
Figure 2C:
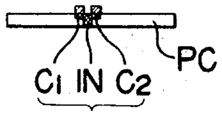
Figure 2D:
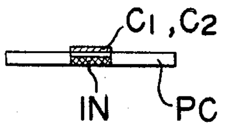

One example of basic construction of feature detection means according to the invention is shown in FIGS. 2A–2D, in which FIG.2A is a planar view, FIGS. 2B and 2C are cross-sectional views, and FIG. 2D is a sectional view taken perpendicularly to the sections shown in FIGS. 2B and 2C. The photosensitive device shown comprises a photosensitive body PC which, in this case, is a panel of photoconductor made of a substance such as, for example, Si, Ge, CdSe, PbS, ZnS, and ZnO, electrodes $C_1$ and $C_2$ in intimate contact with the panel PC, and an insulating layer IN interposed between the electrodes $C_1$ and $C_2$, which are thereby electrically insulated from each other although they are in very close proximity to each other.

These electrodes $C_1$ and $C_2$ and the insulating layer IN constitute a unit detection section D having the function of detecting rings. This detection section D may have an arrangement as shown in FIG. 2B wherein the entire section D, including the insulating layer IN, is completely imbedded within the photoconductor panel PC, or it may have an arrangement as shown in FIG. 2C wherein the insulating layer IN is completely imbedded, or a vacant gap is left, and the electrodes $C_1$ and $C_2$ are formed in intimate contact with the upper surface of the panel PC.

The photosensitivie device of the above described construction operates in the following manner. It will be assumed that an image of a pattern having a ring I is formed on the panel PC surface as indicated in FIG. 2A and that one part of the image crosses the detection section D. Then, since the parts of the photoconductor panel PC on which the image of the ring I is formed become conductive, it becomes possible for current to flow between electrodes $C_1$ and $C_2$ through these conductive parts. Therefore, if a power source $E_1$ (source of direct current, alternating curent, or pulses) to the electrode $C_1$, and a load resistance $R_L$ or, alternatively, an electroluminescent device EL is connected to the electrode $C_2$ in order to extract a load, electrical energy will be supplied from the power source $E_1$ to the load, and an electrical or photoelectrical output will be produced. This output would not be produced if the light image crossing the detection section D were not closed on the panel PC. That is, this means that a ring, which is one of the features of the pattern, is thereby detected.

A plurality of photosensitive units, each as above described and shown in FIGS. 2A–2D, may be stacked in laminar arrangement to form a device for detecting rings in any position within a predetermined region as illustrated by one example in FIGS. 3A–3C. As shown in the planar view of FIG. 3A, the device is here divided in plan view into two regions $R_1$ and $R_2$. Reference character S designates partitioning walls. As shown by the cross sectional view of FG. 3B and the sectional view of FIG. 3C taken perpendicularly thereto, the region $R_1$ is composed of 6 detection panels $PC_1$ through $PC_6$, inclusive, in laminar arrangement with transparent insulating sheets $TI_1$ through $TI_5$, inclusive, interposed therebetween as partitions.

Detection sections $D_1$ through $D_{12}$, inclusive, are respectively provided in panels $PC_1$ through $PC_{12}$, inclusive. The detection section $D_1$ detects rings within the region $R_1$ of any shape which crosses this section. Detection sections $D_2$ through $D_6$, inclusive, which operate in a similar manner, are at the central part of the region $R_1$ and are arranged as shown in FIG. 3B so as to accomplish detection of respective rings at successively different positions.

Then, when a pattern I is formed on the photosensitive surface as shown in FIG. 3A, a ring exists on each of the regions $R_1$ and $R_2$. On the region $R_1$, since the pattern ring crosses the detection sections $D_1$, $D_2$, and $D_5$, outputs from these three sections are simultaneously produced. In the region $R_2$, since a single ring crosses sections $D_8$ and $D_{11}$ within the region $R_2$, outputs are simultaneously produced from two places.

In this case, no output will be produced even if rings smaller than the length of the respective detection sections $D_1$ through $D_{12}$, inclusive, are so formed as to cross simultaneously only one of these detection sections. In the instant system there is, naturally, a constant relationship between the dimensions of the detection sections and the size of image pattern, and, although there are some cases wherein it is necessary to resort to certain measures as will be described hereinafter, it is preferable, in general, that the length of each detection section D be less than the size of the smallest ring which will be produced thereacross. It will also be obvious that it is necessary that parts such as the panels $PC_1$ through $PC_{12}$ and detection sections $D_1$ through $D_{12}$ be transparent so that image forming light will be projected onto any of them.

An alternative arrangement which may be adopted is that wherein the photoconductor panels $PC_1$ through $PC_{12}$, inclusive, respectively have different spectral absorption bands, the wavelengths absorbed by panels $PC_1$ through $PC_7$ being such as not to render panels $PC_2$ through $PC_6$ and panels $PC_8$ through $PC_{12}$ conductive, and the wavelengths absorbed by panels $PC_2$, $PC_3$ being such as not to render panels $PC_3$ through $PC_6$ and panels $PC_9$ through $PC_{12}$ conductive, and the arrangement thereafter being similar to effect operation to the final panels $PC_6$ and $PC_{12}$. Furthermore, the arrangement of the detection sections D is not limited to one row, it being necessary in many cases to use the most desirable arrangement in accordance with factors such as the sizes, probabilities, and positions of the rings which can be produced.

One example of utilization of the above described ring detection system to recognition and discrimination of characters such as Roman alphabet characters, Arabic numerals, Japanese "katakana" characters, and Japanese "hiragana" characters is illustrated in FIGS. 4A–4H. In FIG. 4A, the photoconductor surface PC is divided into two regions $R_1$ and $R_2$, the region $R_1$ being of ellipsoidal shape and is provided with detection sections D of cross shape. The character image to be projected on the rectangular surface PC is of an order such as to coincide with this surface PC (both regions $R_1$ and $R_2$) or is controlled to be of an order to coincide therewith and is so projected. Then, the patterns whose features can be detected, for example, characters having rings within the region $R_1$, are characters such as "a," "o," "Q," "D," and "ロ" as indicated within the brackets in FIG. 4A. In this case, if only the contour part of each character is projected, the result will be even more effective.

FIG. 4B illustrates the case where the photoconductor surface PC is divided into two narrow regions $R_1$ and $R_2$ parallel to the vertical direction. The region $R_1$ is wider than the region $R_2$ and has detection sections D arranged in three horizontal, parallel rows. A ring which crosses any of these detection sections D causes an output to be produced. Accordingly, the patterns which are detected in this case are principally characters forming in each case a ring within the region $R_1$ such as "a," "o," "Q," "D," and "ロ" as shown in FIG. 4B.

FIG. 4C illustrates the case where the right-hand region $R_1$ is wider. Characters such as "lc" and "ゆ" forming rings within the region 1 are detected, and characters forming rings within the region $R_2$ are detected.

FIG. 4D illustrates the case where the photoconductor surface PC is divided into four regions $R_1$, $R_2$, $R_3$, and $R_4$ as shown. Characters such as "ぬ," "ね," "ほ," "は," "あ," and "な" which form rings within the lower right region $R_1$ are detected.

FIG. 4E illustrates the case where the surface PC is also divided into four regions $R_1$ through $R_4$, and characters such as "あ" forming rings within the region $R_1$ are detected.

FIG. 4F illustrates the case where the photoconductor surface PC is divided horizontally into two regions $R_1$ and $R_2$. Characters such as "g," "q," "y," "6," "B," and "あ" forming rings within the region $R_1$ are detected. Furthermore, characters such as "h," "k," "g," "p," "q," "A," and "B" are detected in the region $R_2$.

FIG. 4G also illustrates a case where the surface PC is horizontally divided into two regions $R_1$ and $R_2$, but in this case the upper region $R_1$ has a greater area than region $R_2$. Within the region $R_1$, characters forming rings therein, such as "b," "l," "k," "o," "p," "q," "R," and "9," are detected, and within the region $R_2$, characters forming rings therein, such as "j," "ち," "ま," "よ," and "ろ" are detected.

FIG. 4H illustrates the acse where the region $R_1$ of the arrangement shown in FIG. 4C is divided into three regions, whereby there are four regions $R_1$, $R_2$, $R_3$, and $R_4$ Characters such as を forming rings within the region $R_1$ are detected.

The process of detecting rings such as those indicated in FIGS. 4A–4H will now be considered in greater detail with reference to FIGS. 5A and 5B. It will be assumed that the lines of the character "な" are thin and that, when the character is adjusted vertically and horizontally and projected on the surface PC, the position of the character is as shown in FIG. 5A. This case corresponds to the example shown in FIG. 4D, and only region $R_1$ has a ring. Since partitions S insulate the four regions from each other, the ring within region $R_1$ cannot be detected in region $R_2$, $R_3$, or $R_4$. The intersectional relationship between the ring part of the character "な" and the detection section D is indicated in FIG. 5B, in which reference character I designates the character image.

FIGS. 6A–6C indicate arrangements of detection sections D. FIG. 6A illustrates one example of probability arrangement so designated from the probabilities of the sizes, positions, shapes, etc., of rings which can be formed in one region of the panel PC surface that the probability of a ring in this region being undetected is the least. FIGS. 6A and 6C illustrate examples of relatively simple geometric arrangement and indicate that such arrangements may be freely selected.

An example of construction of a detection section D is illustrated in FIGS. 7A–7C. If the thickness of a bright character image I is greater than the gap between electrodes $C_1$ and $C_2$, there is a possibility of erroneous detection indicating a ring even when no ring exists, and, therefore, such erroneous detection must be prevented. For example, in the case of construction as shown in FIG. 7A, since the width of the insulating member IN is narrow, the electrodes $C_1$ and $C_2$ are short-circuited by the light image I, and an output is produced.

In order to avoid this result, the width of the insulating member IN can be widened to a width amply exceeding the width of the character I as shown in FIG. 7B, or, as shown in FIG. 7C, although the gap between electrodes $C_1$ and $C_2$ is narrow, protuberances of the insulating layer. It can be provided at the both ends of the parallel parts of the electrodes $C_1$ and $C_2$. In this case, however, the limiting condition for the electrodes $C_1$ and $C_2$ to be short-circuited by the light image I as indicated in FIG. 7A is that of the thickness of the image I being greater than the thickness W of the protuberances.

Another example of method and means for detection of rings, concavities, and convexities is illustrated in FIGS. 8A and 8B. In this method, utilization is made of the possibility, when a light image is formed on a photoconductor so as to interconnect electrodes within the same region provided on the photoconductor, of current being passed between the electrodes so interconnected.

More specifically, as shown in FIG. 8A, electrodes $TC_1$ through $TC_{10}$, inclusive, are provided on a photoconductor panel PC, and the space intervals between these electrodes are electrically insulated and isolated by an insulating layer $IN_1$. In order to assure operation even when the gaps between electrodes are narrower than the thickness of the pattern lines as above mentioned, and in order to prevent functioning with straight lines in the case of detection of concavities and convexities as described hereinafter, the protuberances at various parts of the insulating layer $IN_1$ are so formed that the row of electrodes $TC_1$ through $TC_5$, inclusive, on the left hand side of the insulating layer $IN_1$ is insulated from the electrodes $TC_6$ through $TC_{10}$, inclusive, on the right-hand side.

A power source $e_1$ is connected between electrodes $TC_1$ to $TC_2$, and transformers $T_1$ and $T_2$ are connected as loads. Similarly, a power source $e_2$ and load transformers $T_2$ and $T_3$ are connected between electrodes $TC_2$ and $TC_3$. In this manner, power sources $e_1$ through $e_4$ and loads $T_1$ through $T_5$ are connected between electrodes $TC_1$ through $TC_5$, and power sources $e_6$ through $e_9$ and loads $T_6$ through $T_{10}$ are connected between electrodes $TC_6$ through $TC_{10}$. It is necessary that the lines connecting the loads and respective electrodes be amply thin so as not to interfere with the illumination of the projected light, be disposed on the side opposite the surface illuminated by the image forming light, or be made of transparent conductor material.

The principle of detecting concave and convex patterns according to the present invention will now be described with reference to FIG. 8B. When, as shown, a bright image $I_1$ having a convexity on the left and a concavity on the right is formed so as to interconnect the space interval between electrodes $TC_i$ and $TC_{i+2}$, these two electrodes are short-circuited. Then, the corresponding power sources $e_i$ and $e_{i+2}$ (not shown in FIG. 8B) become serially connected, and outputs are produced simultaneously in corresponding transformers $T_i$ and $T_{i+2}$ (also not shown in FIG. 8B).

In this manner, in the system of the invention, in general, a single combination of a concavity and a convexity is detected as two outputs. From the positions of these detected outputs, the corresponding sizes and positions of the concavity and convexity are determined.

On the other hand, an image $I_2$ formed as shown in FIG. 8B with a concavity on its left (and a convexity on its right) does not produce any output because there are no electrodes on the right hand side. That is, the arrangement and construction of the detection section shown detects a pattern with a convexity on the left but does not detect a pattern with a convexity on the right. Similarly, it is possible to construct mechanisms for detecting patterns with convexities facing up, down, left, right, and any other direction.

Referring again to FIG. 8A, it will be observed that the electrode arrangement shown therein is a combination resulting from a vertical back-to-back disposition of single-sided detection sections each as shown in FIG. 8B. Therefore, convexities on both the left and right can be detected. That is, a left-hand convexity is detected by means of electrodes $TC_1$ through $TC_5$, and a hight-hand convexity is detected by means of electrodes $TC_6$ through $TC_{10}$.

In this case, if a left-hand convexity and a right-hand convexity of the same size are simultaneously detected at the same position, it is possible to consider this resultant feature as a ring. Although there is this somewhat imperfect possibility with respect to rings, since there is no necessity of stacking transparent detection panel in multiple layers as in the case of the example shown in FIGS. 3A–3C, the construction of the instant detection section is extremely simple. As a resultant effect, the detection section shown in FIG. 8A is capable of detecting light images in the form of rings and in forms with leftward rightward convexities.

FIGS. 9A and 9B show examples of systems wherein, by arranging in alignment a large number of detection sections each of the construction shown in FIG. 8A, rings, concavities, and convexities are recognized, without exception, from patterns projected on a single surface. The arrangement shown in FIG. 9A is for detecting leftward and rightward concavities and convexities, and that shown in FIG. 9B is for detecting upward and downward concavities and convexities.

The system shown in FIG. 9A contains left and right detection sections $D_{c1}, D_{c2} \ldots D_{c5}$ disposed in five parallel rows as shown in plan view in transparent photoconductor panels $PC_1, PC_2 \ldots PC_5$, respectively. The magnitudes and positions of outputs corresponding to rightward convexities are processed in an output alignment section $O_1$, and the magnitudes and positions of outputs corresponding to leftward convexities are processed in an output alignment section $O_2$. When the magnitudes of the output of $O_1$ and the output of $O_2$ are the same in both magnitude and position, the resulting image is recognized as a ring as mentioned hereinbefore.

The system shown in FIG. 9B is the same as that of FIG. 9A revolved horizontally, whereby the detection of leftward and rightward convexities becomes detection of upward and downward convexities, respectively.

An example wherein the fuction of a plurality of rows of detection sections for detecting leftward and rightward convexities is accomplished in a single-layer photoconductor panel is shown in FIG. 10. The photoconductor panel is divided by partitions S into a plurality of parallel regions which are relatively long in the vertical direction and are provided therewithin at their centers with respective detection sections disposed in the vertical direction. In this case, an image formed on one surface is divided into five parts in predetermined regions, and the presence or absence of leftward and rightward concavities and convexities within each divided region is detected. Accordingly, effective results are obtianed when factors such as the widths and shapes of regions and the shape of the detection sections are determined in accordance with statistical data relating to the characters to be produced.

The construction of the detection sections $D_{c1}$ through $D_{c5}$ may be the same as that shown in FIGS. 8A and 8B. Accordingly, in order to detect, for example, also images which are leftward and rightward concavities and convexities or rings formed on the partitions S and do not cross over the detection sections $D_{c1}$ through $D_{c2}$, an additional detection panel is installed, and the light image is distributed simultaneously also onto this panel thereby to detect concavities, convexities, or rings thereof. Alternatively, transparent detection panels are stacked in laminar arrangement. One example of light image distribution in this case is indicated in FIG. 12.

FIG. 11 indicates one example method of extracting loads as light outputs by means of electroluminescence instead of electrical outputs by means of transformers. By this method, outputs are detected by the luminescing of two or more of electroluminescent devices $EL_1$ through $EL_6$ are connected by the operation of the photoconductor layer.

FIG. 12 shows one example of a method whereby, by disposing in rows and columns a plurality of detection panels for detecting rings, concavities, and convexities according to the invention, each panel being as illustrated in FIG. 10, a single pattern can be simultaneously detected. The light rays from a light image IP are passed through a mirror tunnel $M_t$ and projected by an image forming lens system L simultaneously onto the surfaces of a plurality of detection panels $P_1$ through $P_{12}$ to form the image on each of the panels. In the example illustrated, 12 detection surfaces detect respectively different positions, features consisting of rings, concavities, and convexities, and their sizes.

In FIG. 13 there is illustrated an example of circuit arrangement wherein the connections of the power source switches and loads of the detection device for rings, concavities, and convexities of patterns as indicated in FIGS. 8 through 11 are adapted for serial switching, and control of the luminescing of electroluminescent devices is made possible.

Electric power is supplied from a power source $E_1$, through power source change-over switches $SW_1$ through $SW_5$, to respective electrodes $TC_1$ through $TC_5$. To these electrodes, electroluminescent devices $EL_1$ through $EL_5$ are respectively connected.

While, in the illustration in FIG. 13, each of the electroluminescent devices EL is shown as being connected by a long conductor wire to its respective electrode TC to indicate electrical connection, it may, in actual practice, be connected directly to a conductor and disposed on the reverse side of the photoconductor panel PC. The area of each electroluminescent device is of spot form, and these devices are disposed, for example, in the center of respective electrodes $TC_1$ through $TC_5$. The loads $EL_1$ through $EL_5$ are provided with respective switches $SW_6$ through $SW_{10}$, which, while the power source switches are closed, control the operations of their loads.

By the above described arrangement, detection of the presence or absence of a light image such as to interconnect any two of the electrodes $TC_1$ through $TC_5$ is accomplished in the following manner. First, when the switch $SW_1$ is closed, the switches $SW_2$ through $SW_5$ are open, the result, in effect, being that the switch $SW_1$ has been selected. At this time, only switch $SW_6$ of the switches on the load side is opened, and the switches $SW_7$ through $SW_{10}$ are closed, whereby interconnections between electrode $TC_1$ and electrodes $TC_2$ through $TC_5$ are detected. Similarly, when electrode $TC_2$ is selected, switch $SW_2$ becomes "on," and switch $SW_7$ becomes "off," at which time electrode $TC_1$ may be inoperative (that is, $SW_6$ may be "off"). In this manner, it is possible to select serially each of the electrodes.

The foregoing description relates principally to the case of patterns written or printed in white on a black background, that is, negative patterns. The detection of features of positive patterns which constitutes the second object of the invention will now be described.

Referring to FIG. 14, there is shown a detection device comprising essentially photoconductor films $PC_1$ and $PC_2$ of planar form, an insulating strip CI insulating the films $PC_1$ and $PC_2$ from each other, electrodes $M_1$ through $M_4$, inclusive, provided in contact with the photoconductor film $PC_1$, electrodes $M_5$ through $M_8$, inclusive, provided in contact with the photoconductor film $PC_2$, said electrodes being disposed in symmetrically opposed arrangement in contact with the insulating strip CI as shown, and electrodes $M_9$ and $M_{10}$ short-circuiting the outer peripheries of the film $PC_1$ and $PC_2$, respectively. The device of the above described composition and arrangement is one example of a feature detection panel $FP_1$ constituting the principal part of the detection system according to the invention.

In the example shown in FIG. 14, an image of a pattern on a sheet of paper to be read is formed on the feature detection panel $FP_1$, being projected in the form of a black line I. For the sake of simplicity, it will be assumed that the other parts are white, reflecting planes. The power supply source in this case for detection of the presence of a closed ring of the pattern I is a pulse source $E_0$ as shown, which source supplies three voltages $E_1$, $E_2$, and $E_3$ through a transformer $T_1$. As shown, adjacent secondary terminals are arranged in mutually opposite sense. In the circuits of the voltages $E_1$, $E_2$, and $E_3$, there are connected in series resistances $RS_1$, $RS_2$, and $RS_3$, respectively. Between electrodes $M_1$ and $M_2$, between electrodes $M_2$ and $M_3$, and between electrodes $M_3$ and $M_4$, there are parallelly connected loads $R_1$ (for example, an electroluminescent device $EL_1$ parallelly connected therewith), $R_2$ ($EL_2$), and $R_3$ ($EL_3$), respectively. In the power supply lines, there are connected diodes $D_{11}$, $D_{12}$, $D_{21}$, $D_{22}$, $D_{31}$, and $D_{32}$ to block roundabout voltages from adjacent circuits.

The loop of the first line for the voltage $E_1$ will now be described as a representative example, the loops of the lines of the other voltages being similar. A dark pattern I is formed between the electrodes $M_1$ and $M_2$, and the resistance value of the photoconductor in this part is high, but since this pattern is closed on the film $PC_1$, with respect to the insulating strip CI, the effective result is that the resistance of the photoconductor between the electrodes $M_1$ and $M_2$ is high.

The load $R_1$ is parallelly connected to the space interval between electrodes $M_1$ and $M_2$, and when the impedance between electrodes $M_1$ and $M_2$ is high, the voltage drop across the load $R_1$ increases, whereby binary digit "1" is indicated as output. When the impedance between electrodes $M_1$ and $M_2$ is low, a majority share of the voltage drop of the voltage $E_1$ is assumed by the serial-connected resistance $RS_1$, and the voltage drop across the terminals of the load $R_1$ is low, whereby binary digit "0" is indicated.

If an electroluminescent device $EL_1$ is provided in parallel to the load $R_1$ as shown or is provided in place of the load $R_1$, this device $EL_1$ will luminesce when the output is "1" and will be extinguished when the output is "0." That is, it is possible to indicate binary "1" and "0" with light.

In the example shown in FIG. 14, since there is a dark pattern I dividing the region $PC_1$, the space intervals between $M_1$ and $M_2$ and between $M_3$ and $M_4$ assume a high electrical resistance, whereby the output of the load $R_1$ indicates "1." Similarly, the output of the load $R_3$ at this time should be indicating "1." That is, by the instant example method, when there is a dark line I of rightwardly convex form (leftwardly concave form) crossing over the insulating strip CI, outputs are produced simultaneously in the loads of the photoconductor at the positions where the insulating strip CI is crossed.

In this case, even when the pattern I is, for example, rightwardly convex, as long as the two ends do not cross over the insulating strip CI, the resistance between electrodes $M_1$ and $M_2$ and the resistance between electrodes $M_3$ and $M_4$ are low. For this reason, no output is produced in either.

The electrode $M_9$ is a metal member short-circuiting the periphery of the photoconductor film $PC_1$ and performs an important function in the detection of rings which are closed with respect to the insulating strip CI. More specifically, in the case where the electrode $M_9$ does not exist, even if there is a dark, straight-line pattern which crosses over the insulating strip CI and extends continuously to the ends of the film $PC_1$, the interval between $M_1$ and $M_2$ will assume a high impedance and an output will be produced in load $R_1$. Consequently, it will become impossible to distinguish the case wherein, as in the above described example, a closed black line is formed to cross over the insulating strip CI between the electrodes $M_1$ and $M_2$ and between the electrodes $M_3$ and $M_4$ from the case wherein a line crossing over the space interval between electrodes $M_1$ and $M_2$ and interconnecting the ends of the film $PC_1$ and line crossing over the space interval between electrodes $M_3$ and $M_4$ and interconnecting the ends of the film $PC_1$ are formed.

Although not shown in FIG. 14, the photoconductor film $PC_2$ is also provided circuit connections similar to those of the film $PC_1$ and detects lines with leftward convexities which are closed with respect to the strip CI. Since the electrodes $M_1$ through $M_4$ and electrodes $M_5$ through $M_8$ are disposed symmetrically on opposite sides of the insulating strip CI, lines which are closed on the left and right as shown in FIG. 14 are simultaneously detected. Moreover, when these lines are formed at the same position, the existence of a closed ring formed on the insulating strip CI is indicated.

That is, the feature detection panel $FP_1$ is a panel for detecting rings, concavities, and convexities which indicates the presence of rightwardly convex patterns on the photoconductor film $PC_1$, leftwardly convex patterns on the photoconductor film $PC_2$, and rings on the panel $FP_1$. Moreover, the positions and sizes of these features also become substantially evident. Processing of the resulting outputs to determine discriminatively the positions and other characteristics of the rings, concavities, and convexities is accomplished by a logical circuit LC.

The relationships between the shapes and sizes of the electrodes $M_1$, $M_2$ . . . $M_8$ and the thickness of a line to be detected will now be considered with reference to FIGS. 15A–15C. FIG. 15A shows a desirable condition, and FIG. 15B shows an undesirable condition, while FIG. 15C shows a special case. More specifically, in the case of FIG. 15B, since the electrodes $M_i$ and $M_{i+1}$ are smaller than the thickness of the dark line I, a high resistance is established between electrodes $M_i$ and $M_{i+1}$ even when the line I does not cross over the insulating strip CI, and a pattern other than that with a rightward convexity is also sensed, whereby an output is produced. In contrast, in the case where the size of electrodes $M_i$ and $M_{i-1}$ is larger than the thickness of the dark line I as indicated in FIG. 15A, the resistance between electrodes $M_i$ and $M_{i+1}$ does not become high even when a line I interconnecting these electrodes $M_i$ and $M_{i+1}$ is formed. FIG. 15C illustrates a special case wherein straight lines and rightwardly convex forms are sensed.

FIG. 16 shows an example of a detection panel $FP_1$ for detecting leftwardly convex features, which panel has a construction similar to that shown in FIG. 14. The principle of operation of this detection panel is generally similar to that described in conjunction with FIGS. 1A and 1B. This detection system differs in that a very effective circuit group SC is used.

One diode is provided for each circuit, and pulse sources $E_1$ through $E_4$ constituting power sources are provided for the respective circuits. A transformer may also be used as shown in FIG. 14 for these sources $E_1$ through $E_4$. The loads and corresponding photoconductor parts are parallelly connected, and resistances $RS_1$, $RS_2$, $RS_3$, and $RS_4$ are serially connected in the circuits in the same manner as that shown in FIG. 14. On the point of simultaneous detection, also, the system of FIG. 16 is similar to that of FIG. 14.

FIGS. 17A and 17B illustrate two somewhat modified feature detection panels. In the panel $FP_2$ shown in FIG. 17A, the electrodes on the two sides of the insulating strip CI are not symmetrically disposed. In the arrangement of these electrodes in the instant example, the interrelationship between the region $PC_1$ and the region $PC_2$ is not necessarily taken into consideration. However, the concentration of the arrangement of the electrodes for leftwardly and rightwardly convex forms is determined in accordance, for example, with statistical data relating to patterns which are expected to appear.

FIG. 17B shows one example of a detection panel wherein, as illustrated in FIG. 18, a plurality of electrodes provided in the central part of a photoconductor are used, electrodes $M_2$, $M_3$ . . . $M_{12}$ being provided, and the presence of ring-shaped black lines surrounding these electrodes is simultaneously confirmed. In this case, when the outputs of two or more neighbouring electrodes are produced simultaneously, it can be assumed that there is probably a ring shaped pattern surrounding these plurality of electrodes. Strictly speaking, however, this is insufficient, and a system whereby the existence or nonexistence of conductivity between these electrodes is detected or a serial system wherein a switching circuit is provided in the input power power supply line of each electrode, and these circuits are successively switched is desirable.

FIG. 18 shows one example indicating the principle of detecting pattern rings. An extremely small electrode $M_{1a}$ is disposed in the centre of a thin film $PC_1$ of a photoconductor, which is surrounded by a second electrode $M_{2a}$ of long and narrow form. Power is supplied to the electrodes from a power source $E_0$ through a serially connected resistance $RS_1$ and a load $R_1$ connected parallelly to the photoconductor film $PC_1$ or an electroluminescent device EL connected parallelly thereto. If the resistance of the film $PC_1$ and the impedance of the device EL are matched, only the device EL may be used by removing the resistance $R_1$.

When a black ring-shaped pattern I is formed so as to surround the electrode $M_{1a}$, the resistance between electrodes $M_{1a}$ and $M_{2a}$ increases abruptly, and a large voltage drop is produced across the resistance $R_1$. On the other hand, when there is no dark line such as pattern I surrounding the electrode $M_{1a}$ on the film $PC_1$, the resistance between electrodes $M_{1a}$ and $M_{2a}$ is low, the voltage drop across resistance $RS_1$ is large, and no output is produced at resistance $R_1$. A certain voltage produced in this case becomes noise.

The size of the electrode $M_{1a}$ must be made larger than the thickness of a line I which can be produced. In the case of an especially thick line, the electrode $M_{1a}$ can, in actual effect, be made large by means of a light image. More specifically, by projecting a light spot at a spot containing the electrode $M_{1a}$ so as to form a conductive part larger than the thickness of the line I around the electrode $M_{1a}$, said light spot having an area which is approximately the same as that of said conductive part, an effect equivalent to increasing the size of the electrode $M_{1a}$ is attained. That is, a conductive part is formed by light. This method is equivalent to forming an electrode of exactly the same size as said conductive part as the electrode $M_{1a}$; that is, this method is a kind of variable method of forming an electrode and, together with an embodiment of the invention hereinafter described, constitutes an important aspect of the present invention.

FIG. 19 shows an element $FP_5$ for detecting concavities and convexities of a pattern, which element detects a pattern I with a leftwardly convex form formed to surround an electrode $M_{1b}$ on a photoconductor film $PC_1$ on the same principle as that of the example shown in FIG. 18. This device differs from that shown in FIG. 16 in that the electrode $M_{2b}$ surrounding the periphery of the photoconductor region constitutes the electrode opposed to the electrode $M_{1b}$ and, in this case, is grounded (earthed).

In the circuit arrangement, a resistance $R_1$ is connected in parallel across the interval between the electrodes $M_{1a}$ and $M_{1b}$, and, if necessary, an electroluminescent device EL can be connected in parallel therewith or independently. Power is supplied from a power source $E_0$ through a series-connected resistance RS. When a pattern I is formed, a large voltage drop is produced across the resistance $R_1$, and when a pattern such as the dark line I surrounding the electrode $M_{1b}$ does not exist, a large current flows between electrodes $M_{1b}$ and $M_{2b}$ through the low resistance part of the film $PC_1$. Accordingly, the voltage drop across resistance RS becomes large, and an output is not produced at the load.

Referring to FIGS. 20A–20C, there are shown therein three examples of circuit groups SC. FIG. 20A illustrates the case wherein the output sections of the circuit group SC shown in FIG. 16 is in the form of ordinary transistor circuits. The primary sides of transformers $TD_1$, $TD_2$, $TD_3$, etc., are in series with the loads of the feature detection panel $FP_1$. The resulting outputs are shaped and amplified by transistors $Tr_1$, $Tr_2$, $Tr_3$, etc., whereby pluses for the succeeding logical processing are obtained.

FIGS. 20B and 20C show two examples of simple cases wherein diodes are not used. While there are no diodes in the various lines in the example illustrated in FIG. 20B, power source switches $S_1$ through $S_5$, inclusive, and load switches $SL_1$ through $SL_5$, inclusive, are necessary and are operated, not simultaneously, but serially.

Accordingly, these switches tend to be more expensive and slower than in the case of the power supply system shown in FIG. 16. However, the operation of these switches is positive and reliable, and the pattern positions are determined immediately by the selected switches.

Furthermore, when switch $S_1$ which differs also in the manner of producing an output is selected, only the load switch $SL_1$ is opened, and the other load switches are closed. In general, when the power source switch $S_1$ is selected, the load switch $SL_1$ opens, and all of the other switches close. Accordingly, by the present system, when a pattern is produced in a manner to divide the photoconductor film $PC_1$ into two regions, an output is produced at the load connected to the other electrode within the region to which electrode $M_1$, which is connected by switch $SW_1$, belongs, and no output is produced in the region to which electrode $M_1$ does not belong. That is, the manner in which an output is produced is not that wherein an output is produced at a part where a line is formed but is that wherein an output is produced in a collective manner for each region divided by a line.

In comparison, the above described two examples may be considered to be circuit arrangements which produce differential output of the instant system. Since the photoconductor and the loads $R_1$ through $R_5$ are connected in series, an output is produced when there is no pattern and is not produced when a pattern is present. FIG. 20B shows one example of a load connecting method suitable for cases such as that shown in FIG. 17B. FIG. 20C illustrates one example of the simplest case.

In another embodiment of the invention as shown in FIGS. 21A–21C, the insulating strip between photoconductor regions, that is, the strip corresponding to CI in FIGS. 14, 15A, and others, is eliminated, and, instead, an optical insulating method is used whereby an optical black pattern is created at a desired time at a desired position. That is, a fixed insulating strip such as CI is not provided, but at a desired time the image pattern can be changed to create an insulating zone at a desired part of the detection panel.

FIG. 21A shows one example of a feature detection panel $FP_6$ in which rows of metal electrodes are so formed and symmetrically arranged as to permit the creation of three insulating zones at desired times. Electrodes $M_1$ through $M_7$ and electrodes $M_8$ through $M_{14}$ are disposed in respective rows in symmetrical arrangement on the two sides of a dark pattern produced as indicated by II in FIG. 21B. Electrodes $M_{15}$ through $M_{20}$ and electrodes $M_{21}$ through $M_{26}$ are disposed in rows symmetrically with respect to a dark pattern which can be formed vertically. Similarly, electrodes $M_{27}$ through $M_{32}$ and electrodes $M_{33}$ through $M_{38}$ are arranged symmetrically with respect to a pattern which can be formed vertically.

The power supply circuits for electrodes $M_{33}$ through $M_{38}$ are collectively indicated by a block $SC_1$, and those for electrodes $M_8$ through $M_{14}$ are collectively indicated by a block $SC_2$. The switches for these power supply circuits may be connected for simultaneous detection of concavities and convexities, for example, as shown in FIG. 16.

FIG. 21B illustrates the case wherein, as a pattern, a feature II is formed, and two vertical features are not formed. A problem which here arises is that of forming a dark pattern II. That is, the optical creation of a dark pattern in a bright place is not as simple as the optical creation of a bright pattern in a dark place. In the latter case, no matter what kind of pattern is formed on the detection panel $FP_6$, it is necessary only to project a bright pattern on the panel $FP_6$ by another means. For example, for optical image-forming is possible.

In the former case, however, when a certain pattern is once formed on the panel $FP_6$, if there is no dark line such as II in this pattern, the bright parts of the original pattern cannot be made dark even if a dark line is afterward projected by a separate optical means. That is, unless an optically serial means is resorted to, the desired pattern cannot be obtained. This indicates that, in order to obtain the desired pattern, means for forming such a pattern must be provided beforehand in the light source, itself, for projecting light in the form of the pattern to be read.

That is, it becomes necessary to resort to measures such as illuminating the pattern to be read by forming an image such as a film image on the surface of the pattern to be read, providing illumination by using parallel light rays for the light source and projecting said rays on the surface for reading the pattern such as a pattern of a film, or using an arrangement wherein screening bodies SB with perfect light absorptance are placed directly upon a pattern P to be read as shown in FIG. 21C, and the pattern is irradiated by a light source LS. Alternatively, for the parts corresponding to the screening bodies SB, shadows may be formed on the feature detection panel $FP_6$. By these various methods, a variably dividing method for optically creating insulating parts becomes possible. Such a variably dividing method constitutes another essential aspect of the present invention.

FIG. 22 schematically illustrates a method for creating by light projection the electrode $M_1$ around the detection panel $FP_3$ shown in FIG. 17B, this electrode $M_1$ so created being designated by reference characters CPC in FIG. 22. Light for said light projection is supplied from a light source LS which illuminates a picture screen $P_1$ containing a pictorial object LR. The light rays for forming an image of the object LR are projected by a lens system $L_1$ onto the detection panel $FP_3$.

On one hand, the pattern to be read is provided, for example, as characters "AB" written on a pattern screen $P_2$ and projected through a lens system $L_2$ onto the panel $FP_3$. In this manner, through the use of a pictorial object LR, it is possible to create freely at a desired time a conductive part CPC corresponding to the electrode $M_1$. By changing the picture screen $P_1$ on which the object LR is drawn, the conductive part CPC can be freely changed. For example, by preparing a large number of screens $P_1$ with objects LR of various forms as necessary and selecting these objects by means of an optical switch or selecting the illumination, a conductive part CPC of any desired shape can be created at will. In this case, in order to gather a large number of images at one position, a multiple reflective mirror tube such as a mirror tunnel (kaleidoscope) can be effectively used. For high-speed switching of the illumination, an electroluminescence light source is effective.

Another embodiment of the variable electrode according to the invention is shown in FIG. 23. In this apparatus, the feature, detection panel is a laminated structure comprising essentially glass plates $g_1$ and $g_2$ as outer layers, transparent conductor films $TC_1$ and $TC_2$ respectively in intimate contact with the glass plates, photoconductor layers $PC_1$ and $PC_2$ respectively in contact with the films $TC_1$ and $TC_2$, and an opaque film OL interposed between the layers $PC_1$ and $PC_2$.

This apparatus is an example of a comparing device for comparing pattern features. The white part of the pattern on a paper sheet $P_3$ as shown in FIG. 23 is formed by a lens system $L_{2a}$ as an image on the photoconductor layer $PC_2$ to create a conductive part of this shape. This is equivalent to disposing an electrode of said shape in intimate contact with the photoconductor layer $PC_1$ through the opaque dielectric layer OL. A lens system $L_{1a}$ is provided to form a pattern image on the first photoconductor layer $PC_1$ in accordance with feature output light signals.

Position signals of features are compared with the conductive part of layer $PC_2$ determined by the object LR of the sheet $P_3$, an output being produced when there is a light input on the conductive part of the image LR, and no output being produced when there is no light input. Accordingly, by changing the pattern of the image LR formed on the photoconductor layer $PC_2$ for comparison, it is possible to establish a comparison conductive part of any shape.

A variable electrode or dividing system as above described is applicable not only to compound logical operations in feature detection devices and comparison devices but also to a wide range of uses by generally affording a part of the functions of electrodes in computing devices operated by light. Furthermore, by combining a variably insulating system and a variable electrode system of the instant types, a unique, logical operation system of even higher effectiveness can be produced.

One example of such combination of a variably insulating system and a variable electrode system is illustrated in FIGS. 24A and 24B. This system greatly increases the functional effectiveness of the variable feature detection panel $FP_6$ shown in FIGS. 21A–21C. In the case where the size of each of the electrodes $M_1$ through $M_{38}$ is larger than the thickness of the line of the pattern I to be read, the configuration shown in FIG. 15A is not necessarily desirable. In FIG. 24A, an upwardly convex pattern I is formed on electrodes $M_{17}$ and $M_{36}$. If these electrodes are larger than the thickness of the pattern I, the parts thereof resulting from the difference will not become nonconductive even when the pattern I is formed, and, consequently, current will leak from said parts. That is, in the case shown, the resistance between $M_1$ and $M_2$ and the resistance between $M_6$ and $M_7$ will not become high, and features cannot be detected. Accordingly, in the example shown, the area of each of the electrodes $M_1$ through $M_{38}$ are made very small.

However, if the electrodes $M_1$ through $M_{14}$ in contact with the insulating zone II are left in their small state, their performance will not be satisfactory as is observable from the principle described with respect to FIG. 15B. In this case, therefore, it is necessary to make the electrodes $M_1$ through $M_{14}$ large. For this purpose, the variable electrode system can be utilized to form a light image CPC around each electrode $M_i$ as indicated in FIG. 24B thereby to obtain the same effect as that produced by physically expanding the electrode. Thus, each of the electrodes $M_1$ through $M_{14}$ is provided with an electrode CPC created by a light image.

Examples of specific composition and arrangement of a concavity and convexity detection panel and its detection circuits SC are illustrated in FIGS. 25A–25C. FIG. 25A illustrates an arrangement comprising three electrodes $M_1$, $M_2$, and $M_3$ and an electrode $M_4$ partly enclosing the periphery of the photoconductor PC and open toward the right. The circuit group SC is similar to that shown in FIG. 16. The arrangement shown in FIG. 25B is almost the same as that shown in FIG. 25A, but the electrode $M_6$ partly enclosing the periphery of the photoconductor PC is separated from electrodes $M_1$ and $M_5$. There is almost no difference in performance between the devices shown in FIGS. 25A and 25B.

For the outputs of these devices, a circuit arrangement as shown in FIG. 20A which accomplishes pulse shaping amplification may be used as a general type of electrical circuit. By such an arrangement, however, when the number of loads and the number of characters to be read increases, the data processing thereof requires an extremely large number of transistors and diodes and corresponding circuits. Therefore, in the examples shown in FIGS. 25A–25C, electroluminescent elements EL are used as loads, as described herebelow with respect to a few examples for the case of data processing by light transmission.

One example of arrangement and construction of various regions of an electroluminescent element EL in correspondence to the loads indicated in the circuits of FIGS. 25A and 25B is shown in FIG. 25C. As shown, on a glass plate *g*, there are secured divided nesa films $TC_1$ through $TC_4$, which are confronted by respective electrodes $J_1$ through $J_4$ with a thin film of electroluminescent material EL interposed between the rows of nesa films and electrodes. The parts designated by $J_1$ through $J_4$ and by $TC_1$ through $TC_4$ in each of the FIGS. 25A and 25B correspond respectively to the electrodes and nesa films of like designation in FIG. 25C.

FIGS. 26A–26E show an example of alignment of four panels each consisting of a mosaic containing in parallel rows four concavity and convexity detection elements, each of which are of the construction shown in FIGS. 25A–C. When loads are provided to correspond to respective detection regions as indicated in FIG. 25C, output luminescing surfaces each divided into 16 parts as indicated in FIGS. 26B, 26C, 26D, and 26E are produced. That is, each of the 16 feature surface divisions indicates the presence or absence of a specific concavity or convexity, emitting light to indicate "presence" and not emitting light to indicate "absence," thereby indicating a binary output.

Figure 26A:
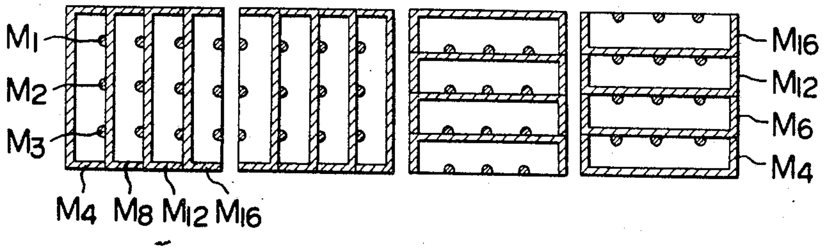
Figure 26B:
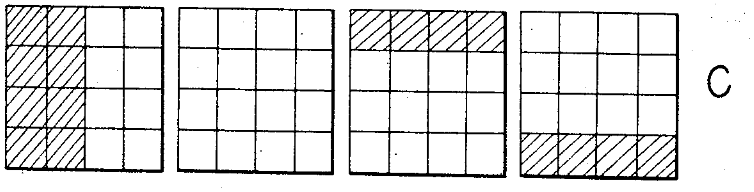
Figure 26C:
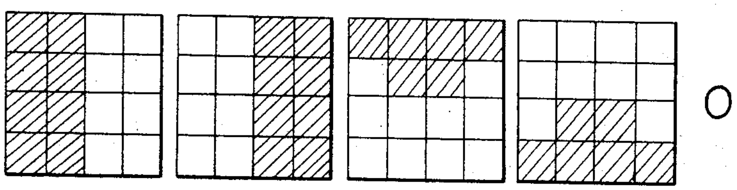
Figures 26D, 26E:
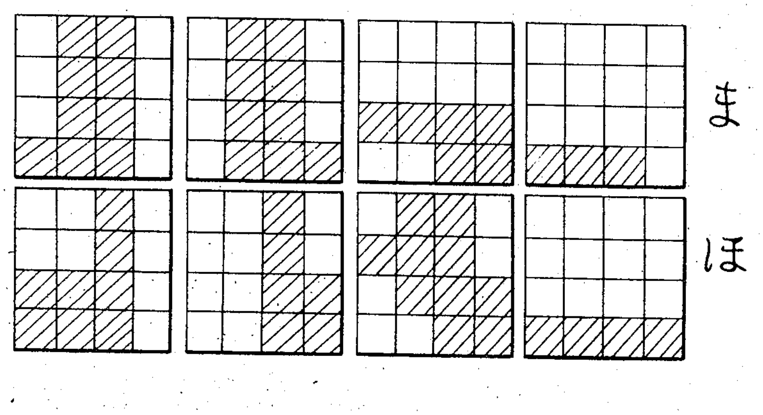
Figure 27A:
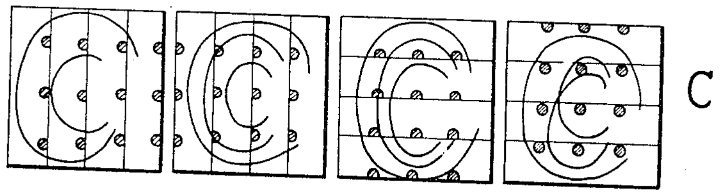
Figure 27B:
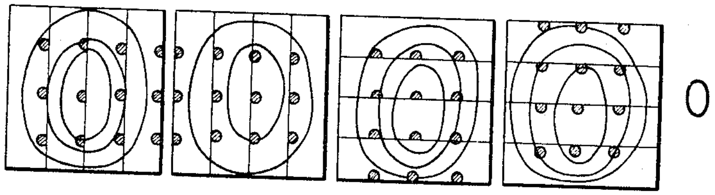
Figure 27C:
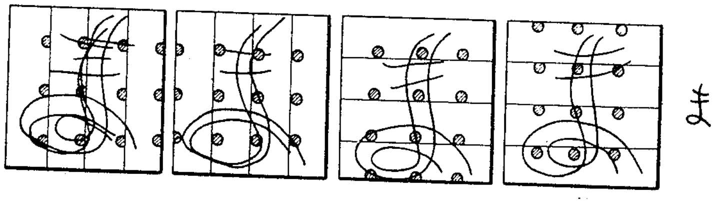
Figure 27D:
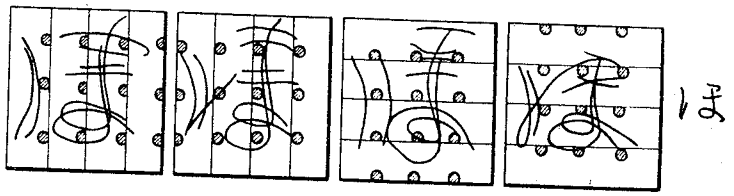

In FIGS. 26B through 26C, the states of load regions capable of emitting light with respect to Roman characters "c" and "o" and Japanese "hiragana" characters "ま" and "ほ," respective, are indicated by diagonal hatching, these characters being taken merely as typical examples. The four detection panels shown in FIG. 26A are adapted to detect the concavities and convexities of four kinds, namely from left to right, "leftward convexity," "rightward convexity," "upward convexity," and "downward convexity," and the principle of the occurrence of the respective outputs is indicated in FIGS. 27A–27D.

FIGS. 27A through 27D correspond respectively to FIGS. 26B through 27E. As shown, the characters are hand written, and their positions and sizes are selected to vary widely. In order to make possible the reading of even characters of positional shifting and deformation of this order, a comparison and discrimination system wherein occurrence of a feature output within the cross-hatched regions shown in FIGS. 26A–E is determined by "1," and nonoccurrence of output is determined by "0" may be used. For example, by judging whether or not the outputs corresponding to FIGS. 26B through 26E are produced on the photoconductors in the shapes of the cross-hatched regions, complicated circuitry and transistor amplifier circuits are made unnecessary.

FIGS. 26B through 26E correspond respectively to characters "c" and "o" and characters "ま" and "ほ" which may be indistinguishable from each other in some cases and lead to misreading. In comparison of these characters, an effective method of indicating that parts thereof are in cross-hatched regions and, at the same time, are not in white regions (regions other than cross-hatched regions being so called for the sake of convenience) is to detect separately and logically process the outputs within the cross-hatched regions and the outputs within the white regions.

As described above, by the practice of the present invention it is possible to detect features such as concavities, convexities, and rings of patterns, in general, of both positive and negative image together with information indicating their positions and size. Moreover, the invention affords a substantial degree of tolerance with respect to deviations such as those of line thickness, size, shape, positional blurring, and inclination, and, at the same time, all operations are completed simultaneously with the photoelectrical conversion. It is apparent that if operations of this nature were to be carried out by means of conventional data processing systems, many difficulties would be encountered, and a complicated logical system would result.

The present invention further affords, in logical processes of this nature, necessary pattern division and determination of electrode shapes by optical projection in a simultaneous manner. While the foregoing description relates principally to the use of photoconductors, it should be understood that various teachings of the present invention are effectively applicable also in the utilization of other means such as, not only photoelectric structures such as light batteries (photocells), photodiodes, and fluorescent surfaces of photoelectron radiation cathode-ray tubes, as will be obvious to those skilled in the art, but also current conductive pencils, current conductive papers, and current conductive inks.

Furthermore, for the luminescent substance to be utilized as loads, recently developed semiconductor lasers and p-n luminescent devices such as those of GaAs and GaP are extremely promising on the points of high luminance and reliability. As photoconductors, also, the utilization of solar batteries (reverse bias also being possible), silicon, and germanium, etc., with matched impedance, is also conceivable as being extremely effective in the recognition of patterns.

Furthermore, according to the present invention, conventional electronic computers or, alternatively, systems depending on complicated, single-purpose logical circuits are replaced by photoelectric surfaces comprising principally a single panel or several panels of a photoconductor, whereby performance is improved, and the apparatus is miniaturized and lowered in cost. Moreover, functions thereof such as information division and processing are parallel and simultaneous, and the nature of said processing is superior to conventional processing, whereby, when the system of the invention is used in conjunction with various planar processing mechanisms, it is possible to produce a highly effective pattern recognition apparatus.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What I claim is:

1. A pattern feature detecting system comprising:

(1) a photosensitive device having a photoconductive layer, at least one insulating layer with protuberances thereof which is provided in the photoconductive layer into plural sectional regions, and at least a set of electrodes intimately embedded in the photoconductive layer along one side of said insulating layer within one sectional region in such a manner that said electrodes are disposed apart from each other by said protuberances therebetween and the lateral width of said protuberances being so designed to be wider than that of the electrodes;

(2) means for imaging a lighted unknown character to be identified upon said photoconductive layer;

(3) source means for supplying an electric power between any two of the electrodes within each of said electrode set; and (4) output means coupled to the circuit of said two electrodes and source means for indicating the existence of a feature only when an arcuate feature of an unknown character is imaged on the photoconductive layer within said one sectional region to provide an arcuate photoconductive region which operatively connects said two electrodes with each other, thereby detecting the existence of an arcuate feature of an unknown character.

2. A system according to claim 1, wherein said photoconductive layer is divided into two sectional regions by the insulating layer with protuberances thereof, and there are provided two sets of electrodes intimately embedded in the photoconductive layer along both sides of said insulating layer; thereby detecting the existence of an arcuate feature of an unknown character in both the sectional regions, respectively.

3. A pattern feature detecting system comprising:

(1) a composite photosensitive laminar assembly including a plurality of transparent photoconductive plates, each plate having an insulating layer with protuberances and two sets of electrodes, said insulating layer being provided in the photoconductive plate therethrough to divide the plate into two sectional regions, each set of said electrodes being intimately embedded in the plate along one side of said insulating layer within one sectional region, respectively, in such a manner that one set of electrodes are disposed apart from each other by said protuberances therebetween, the lateral width of said protuberances is designed to be wider than that of the electrodes, the respective photoconductive plates being serially stacked with each other in such a manner that each combination of an insulating layer and two sets of electrodes provided in each plate may be set forth in different rows of an array from plate to plate;

(2) means for imaging a lighted unknown character to be identified upon said stacked photoconductive plates, respectively;

(3) source means for supplying an electric power between any two of the electrodes within each of said electrode set; and (4) output means coupled to the circuit of said two electrodes and source means for indicating the existence of feature only when an arcuate feature of an unknown character is imaged on the photoconductive layer within said one sectional region to provide an arcuate photoconductive region which operatively connects any two of the said electrodes to one another, thereby detecting the existence of an arcuate feature of an unknown character.

4. A pattern feature detecting system comprising:

(1) a photosensitive device including a photoconductive layer, an insulating layer provided in said photoconductive layer therethrough, at least a set of electrodes disposed along one side of the said insulating layer and intimately embedded in the photoconductive layer, and an outer conductor region provided in the photoconductive layer together with said insulating layer encircling said one set of electrodes therein;

(2) means for supplying an electric power between any two of the electrodes within said set of electrodes;

(3) means for imaging a darkened unknown character to be identified upon said photoconductive layer; and (4) output means coupled between two electrodes in each electrode set for providing a distinguishable indication for indicating the existence of feature only when at least one of said two electrodes are encircled by the whole of the line of said darkened unknown character and the said insulating layer, said line of darkened unknown character providing the line of non-conductive region on said photoconductive layer, thereby detecting an arcuate feature of an unknown character.

5. A pattern feature detecting system according to claim 4, wherein there are provided two sets of electrodes along both sides of the insulating layer which divides said photoconductive layer into two sectional regions, and said outer conductor region is provided to encircle said each set of electrodes in each sectional region, respectively, thereby detecting a ring-shaped feature of an unknown character.

6. A pattern feature detecting system according to claim 4, wherein the lateral width of the electrodes is wider than that of the line of imaged character.

7. A pattern feature detecting system according to claim 4, wherein said photosensitive device comprises a substrate with a photoconductive layer having a plurality of electrodes embedded in the photoconductive layer, and means for projecting a darkened line on the photoconductive layer to provide an insulating layer in said photoconductive layer, said insulating layer being provided to divide the photoconductive layer into a plurality of sectional regions with the electrodes therealong.

References Cited

UNITED STATES PATENTS

| | | | |
|---|---|---|---|
| 3,104,368 | 9/1963 | Steinbuch | 340—146.3 |
| 3,181,120 | 4/1965 | Lieberman | 340—146.3 |
| 3,303,468 | 2/1967 | Liebson | 340—146.3 |
| 3,308,430 | 3/1967 | Clowes | 340—146.3 |
| 3,328,563 | 6/1967 | Kollar | 340—146.3 |

MAYNARD R. WILBUR, Primary Examiner

L. H. BOUDREAU, Assistant Examiner